Aug. 4, 1964 R. L. McINTYRE 3,143,730

ANALOG DIGITAL CONVERTER

Filed Aug. 27, 1959 4 Sheets-Sheet 1

INVENTOR.

BY ROBERT L. Mc INTYRE

ATTORNEY

INVENTOR.
ROBERT L. Mc INTYRE
BY [signature]
ATTORNEY

*INVENTOR.*
ROBERT L. McINTYRE

*BY* [signature]

ATTORNEY

INVENTOR.
ROBERT L. McINTYRE
BY [signature]
ATTORNEY

United States Patent Office 3,143,730
Patented Aug. 4, 1964

3,143,730
ANALOG-DIGITAL CONVERTER
Robert L. McIntyre, Glendale, Calif., assignor to General Precision, Inc., a corporation of Delaware
Filed Aug. 27, 1959, Ser. No. 836,537
13 Claims. (Cl. 340—347)

This invention relates to analog-to-digital converters and associated logical control and read-out circuitry. The invention is more particularly related to a digitizing disc type of converter which includes a plurality of concentric annular tracks of conductive and nonconductive segments, and which includes a plurality of resilient, electrically conductive reading brushes associated with corresponding ones of the annular tracks.

The degree of precision exhibited by the digital type of computers and data recorders has caused these digital mechanisms to be widely used at the present time, even for the computation of analog quantities. However, it is clear that before such digital computations and recordings can be made, analog quantities must be converted into their equivalent digital values. Many types of analog-to-digital converters are known to the art for forming such conversions.

An improved type of analog-to-digital converter has recently been devised. In the improved converter a plurality of electrically conductive segments are mounted on one or both surfaces of a rotatable disc commutator. The segments are arranged on the disc in a binary digital pattern, for example, and in concentric annular tracks. Each of the tracks on the disc is intended to represent binary digits of different ordinal significance.

It is usual in the type of converter referred to above for the annular track representing the least significant binary digit to be located at the rim of the digitizing disc, and for the track containing the segments representing the most significant digit to be disposed near the center of the disc. It is also known at present to utilize a plurality of discs, with the discs being inter-coupled with one another through suitable reduction gearing, so that the represented binary digits may increase in significance from track to track on each disc, and from disc to disc.

The prior art analog-to-digital converter discs under discussion usually include a plurality of stationary electrically conductive resilient brushes, or their equivalent, and these brushes are positioned to contact the segments in the different annular tracks on the disc. Then, the analog quantity represented by the angular position of the converter disc at any instant is converted to binary signals, representing the equivalent multi-digit binary number. This conversion results from the electric engagement of the respective brushes with the conductive and nonconductive segments in the corresponding concentric annular tracks on the disc.

One of the problems encountered in the prior art commutator disc converters of the type described in the preceding paragraphs has been that of avoiding reading ambiguities. Because of mechanical tolerances, imperfections and wear, the condition can arise where a particular brush engages a conductive segment in its particular tracks at an instant when it should engage a nonconductive segment, and vice versa. These ambiguities occur in the different annular tracks at the transition points between the conductive and nonconductive segments.

These reading ambiguities have been eliminated in an analog-to-digital converter described and claimed in copending application, Serial Number 467,154 filed November 5, 1954, in the name of Leo P. Retzinger, Jr., now U.S. Patent No. 3,056,956. The converter disc assembly disclosed in the copending Retzinger application involves the use of two displaced brushes for each concentric annular track on the disc, except for the track of least significance. The engagement of the brushes in any particular track with corresponding conductive segments in that track determines which of the two brushes of the next succeeding track is to be selected. The physical positioning of the brushes is such that the selected brush in any track is positively and completely on its proper segment at the time of a brush selection and is not passing over the edge of that segment. This use of paired brushes in the various annular tracks has been found to resolve the ambiguities which would arise if a single brush were used for each track.

The selection of a brush in a particular pair in the converter of the Retzinger application is dependent upon certain factors. For example, the selection of a brush in a particular pair is dependent upon the engagement of the selected brush in the preceding pair with a conductive segment or a nonconductive segment. In one embodiment of the Retzinger converter, for example, when the selected brush in the preceding pair engages a conductive segment in its track, then the lagging brush in the particular pair in selected for reading. On the other hand, when the selected brush in the preceding pair in the Retzinger converter engages a nonconductive segment, then the leading brush in the particular pair is selected for reading.

In order to satisfy the conditions described in the preceding paragraph a switching effect is required whenever it is necessary to change from a leading to a lagging brush, and vice versa. Therefore, a switching effect in one instance is generated by the engagement of the lagging brush in the preceding pair with a nonconductive segment, and the switching effect in another instance is generated by the engagement of the leading brush in the particular pair with a conductive segment. The logical circuitry required for generating such switching effects must then include both high pass logic gates and low pass logic gates, or extraneous logical inverter networks must be incorporated in the logical circuitry.

The mixed use of high-pass and low-pass logic gates in logic control circuitry creates certain problems. For example, if the flip-flops in the control circuitry are designed to be triggered by negative-going clock pulses whose application to the flip-flops is controlled by logic gates, the amplitude of the clock pulses must be accurately regulated between critical high and low limits, if low-pass gates are used. But the amplitude of the clock pulses is not as critical if high-pass logic gates are used. If the amplitude of the clock pulses is too high, the low-pass gates will pass the pulses even though the gate is actually closed. Conversely, if the amplitude of the clock pulses is too low, the flip-flop will not trigger even when the gate is actually open. Such regulation of the clock pulse amplitude has presented problems, especially when the equipment is to be used under widely varying temperature conditions. On the other hand, if high-pass logical control circuitry is used throughout, to avoid the use of low pass gates, then the use of additional circuitry, such as an inverter, is required with one set of brushes.

The analog-to-digital converter assembly and system of the present invention is advantageous in that it permits the use of one type of logic gate throughout the logical control circuitry in which it is incorporated so that the problems arising from the use of mixed types of logic gates do not arise. For example, as will be described in more detail subsequently, high-pass logic gates can be used throughout the read-out circuitry included in the system so that clock pulse regulation problems do not arise. Moreover, the necessary signal inversion is carried out at the converter information member itself, so that no extraneous logic inverter circuits are required.

An additional feature of the present invention is the fact that the information members for use in the system of the present invention and their associated electrical contact brush assemblies can be constructed in a relatively simple and economical manner. Moreover, relatively simple modifications are required to the converter assembly of the Retzinger application in order to practice the present invention, which will be described in more detail as the description proceeds.

Another feature of the present invention, and one which also will become more apparent as the description proceeds, is that the digital output of the system may be, for example, in an ascending progression of binary numbers, regardless of the direction of motion of the information number, when the read-out control circuitry is properly connected for the particular motion. This is convenient when the motion of the information member is in a particular direction and cannot conveniently be altered, and when a particular progression of binary output numbers is required.

The digitizing discs used for analog-to-digital conversion in the system described in the co-pending Retzinger application may be used in carrying out the concepts of the present invention. When such discs are used, it is merely necessary, for example, to displace the lagging brush of each pair in the different annular tracks by a full segment. Such a displacement of the lagging brush in each pair causes that brush to engage a conductive segment on the information member at the precise time that it engaged a nonconductive segment in the Retzinger assembly, and vice versa. Then, by the use of logical control circuitry to be described, the desired simplifications can be realized by eliminating the need for both low-pass and high-pass logic gates, or the need for inverters to adapt the signals for use in but one type of logic-gate.

Patent 2,873,441 which issued February 10, 1959 in the name of C. A. Miller discloses an analog-to-digital converter disc assembly which is similar in some respects to the assembly of the Retzinger application discussed above. In the Miller assembly certain electrical and mechanical advantages are realized by staggering or skewing the conductive and nonconductive segments in each annular track with respect to the segments in the other tracks. This permits at least some of the electric contact brushes to be disposed in a radially aligned relationship for increased accuracy, and it also provides a construction on the disc whereby electrical conductivity to the conductive segments in the different annular tracks is assured by providing wider conductive areas between tracks.

It has been found that the novel results and advantages of the present invention can be achieved by making a mirror image of all the annular tracks of the disc described and illustrated in the Miller patent. By making such a mirror image, the brushes can be disposed in the same position as on the assembly described in the Miller patent. This has certain advantages since it enables the concepts of the present invention to be carried out without the need for changing the physical mount for the brushes from that manufactured and used in conjunction with the skewed disc of the prior art converter and it enables all the advantages of the Miller construction to be realized in the practice of the present invention. In the drawings:

FIGURE 1A is a schematic representation of a dual brush digitizing disc assembly of the prior art type and similar to the ambiguity-resolving assembly described and claimed in the co-pending Retzinger application, the illustrated disc having conductive and nonconductive segments arranged in concentric annular tracks and being rotatable in a counter clockwise direction for reading in an ascending order of binary numbers.

Figure 1A:
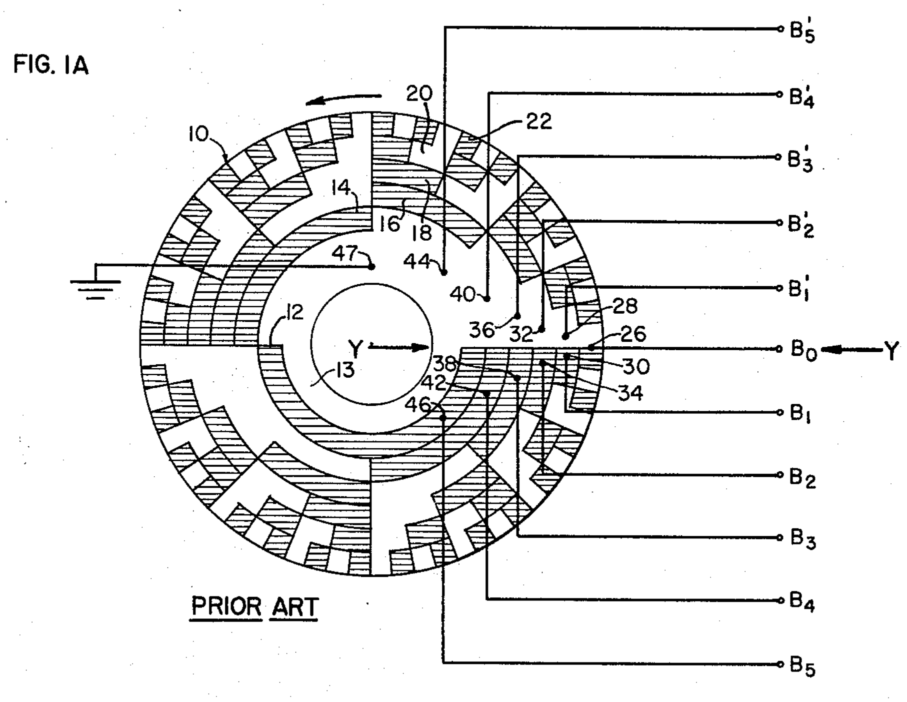
FIGURE 1B is a developed view of the prior art disc of FIGURE 1A, the developed view being useful in clarifying the description of the dual brush action of the assembly.
Figures 1B, 2B, 3B, 4B:
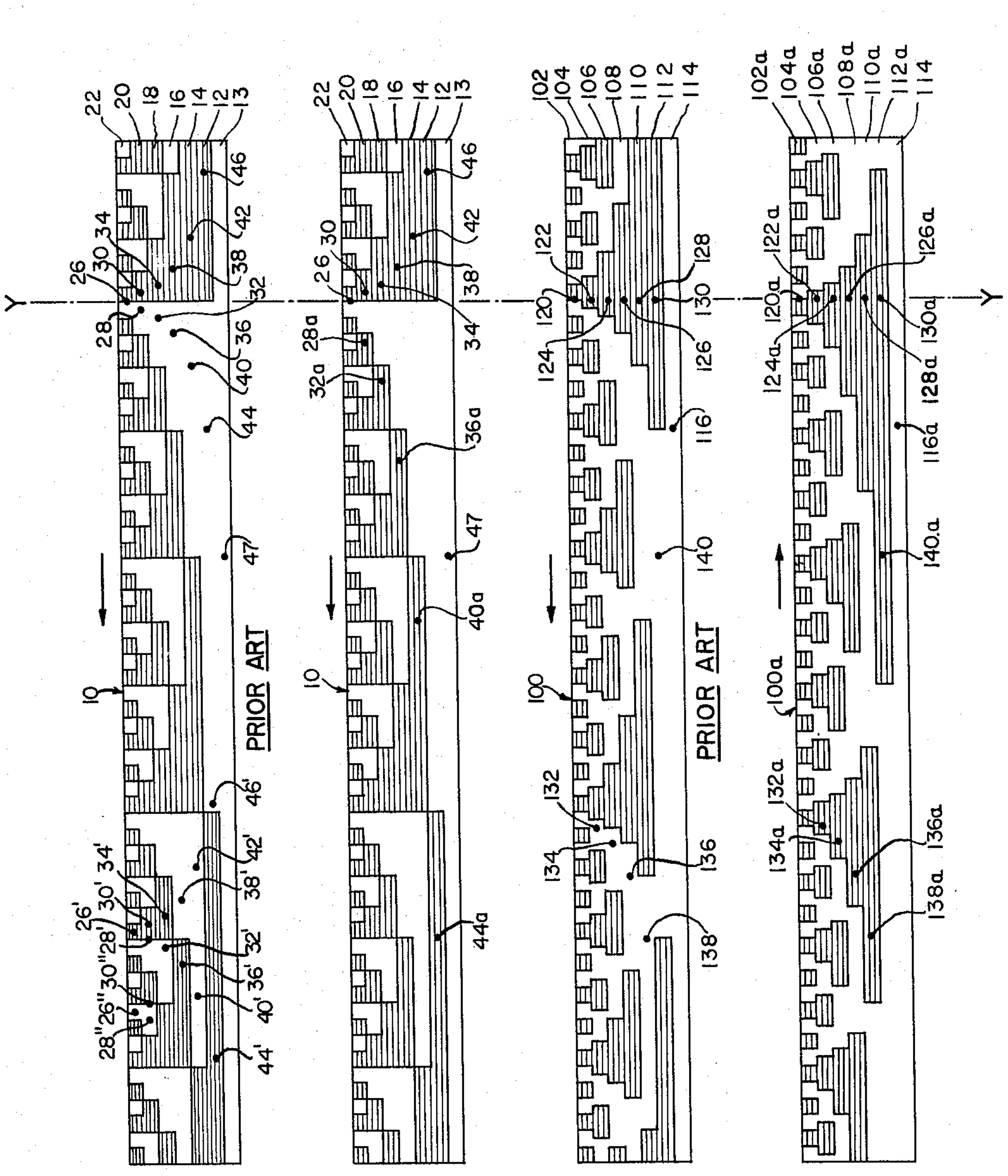
FIGURE 2B is a developed view of the disc of FIGURE 2A, this latter view being helpful in understanding the operation of the assembly of FIGURE 2A.
FIGURE 3B is a developed view of the disc of FIGURE 3A, this latter view being helpful in understanding the operation of the assembly of FIGURE 3A.
FIGURE 4B is a developed view of the disc of FIGURE 4A and its associated brushes, this view being helpful in understanding the manner by which the mirror images disc of FIGURE 4A is capable of achieving the objectives of the invention.

The digitizing analog-to-digital converter disc in FIGURES 1A and 1B is designated 10, and this disc may be mounted on an appropriate shaft for rotation in either direction, but will read in an ascending order of binary numbers when rotated in a counterclockwise direction. Although a disc 10 is shown, any suitable type of information member may be used. For example, the number may be moved in a linear direction rather than a rotary direction and the information may be disposed in linear tracks rather than annular tracks on the member.

The disc 10 may be made from a suitable insulating material, and it is provided with a plurality of electrically conductive arcuate segments on at least one of its surfaces. These electrically conductive arcuate segments are arranged on a surface of the disc in a plurality of nested concentric annular tracks 12, 14, 16, 18, 20 and 22. The non-conductive segments are shown by the shaded areas in each of the annular tracks.

As will be described, the conductive and non-conductive segments on the disc 10 are arranged in a pattern representing multi-digit binary numbers, with the annular tracks of the commutator disc representing successive binary bits increasing in ordinal significance with each track from the outer to the inner track. The disc 10 also includes an annular inner track 13 which is entirely conductive and to which electrical contact may be made. The track 13 and all the conductive segments of the other tracks are interconnected so that any connection to the track 13 is made to all the conductive segments. In the illustrated embodiment, the track 13 is grounded through an appropriate contacting brush 47, so that the conductive segments in all the annular tracks are established at ground potential.

As used in the specification and in the claims, the terms "conductive" and "non-conductive" for the segments in the different tracks are intended to include any type of construction for producing different types of signals. For example, the "conductive" segments may be raised portions of a particular material and the "non-conductive" segments may be depressed portions of the same material. By way of further illustration, the "conductive" portions may be material of a first magnetic permeability and the "non-conductive" portions may be material of a second permeability different from the first permeability. The "conductive" and "non-conductive" segments may also have different properties of light transmission or reflection.

The annular track 12 has a conductive segment extending through an arc of substantially 180 degrees. The track 14 has two conductive segments extending through 90 degrees, with each of the conductive segments being separated by a non-conductive segment having an angular length of 90 degrees. The track 16 has four conductive segments each having an angular length of approximately 45 degrees, and each being displaced from the adjacent segment by non-conductive segments having angular lengths of 45 degrees. The track 18 has eight conductive segments each having an angular length of 22½ degrees, and each of the conductive segments are separated from the next adjacent segment by a non-conductive segment having an angular length of 22½ degrees. Likewise, the track 20 has sixteen equally spaced conductive segments of an angular length of 11¼ degrees, and the track 22 has thirty-two equally spaced conductive segments with individual angular lengths of 5⅝ degrees. It will be appreciated that the lengths described above for the conductive segment in the different tracks are preferably for a binary converter and that the conductive segments may have different lengths when the analog quantity is converted to a digital number having a radix different from "2."

Figure 2A:
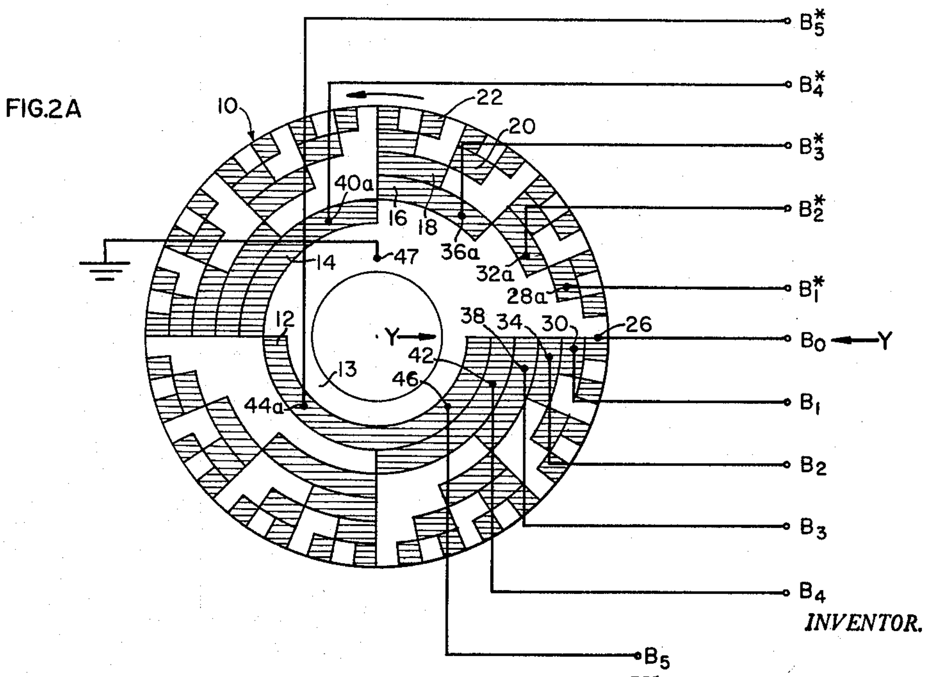
FIGURE 2A is a schematic representation of the assembly of FIGURE 1A as modified in accordance with the concepts of the present invention in which the lagging brushes are shifted to contact conductive segments for angular positions of the disc at which they previously contacted non-conductive segments, and vice versa.

The leading edges of one of the non-conductive segments in each of the annular tracks 12, 14, 16, 18, 20 and 22 on the disc 10 are aligned along the axis Y—Y in the position of the disc shown in FIGURES 1A and 2A and which represents the "0" position. Of course, such alignment is not necessary, as will be evident in the description of FIGURES 3A and 4A, since the contacting brushes can be staggered in accordance with any desired skewing or staggering of the segments. However, for purposes of simplicity in description and understanding in the description of one embodiment of the invention, the conductive segments are illustrated in FIGURES 1A and 2A as being aligned along the Y—Y axis. The binary number can be read at any instant whether the disc is stationary at some position or is rotating in either direction. However, the drawings indicate the direction of movement to read an ascending order of binary members.

It will be appreciated that a series of stationary conductive brushes may be disposed along the Y—Y axis in respective sliding engagement with the different annular tracks 12, 14, 16, 18, 20 and 22. Then, as the disc 10 rotates in a counterclockwise direction, the conductive segments in the various tracks make successive contacts with the brushes in a manner to establish a binary count across the brushes. It will be appreciated that the term "brush" as used in the specification and claims includes any type of member capable of producing signals upon being disposed in coupled relationship to a "conductive" segment. As such, the "brush" does not have to engage the "conductive" segment but may be any type of receiving member. Furthermore, although the disc 10 is described as being movable and the brushes as being stationary, it will be appreciated that the brushes may be movable and that the disc may be stationary.

Considering the tracks 12, 14, 16, 18, 20 and 22 as being arranged in an order to represent binary digits of decreasing ordinal significance, then the outer row 22 may be considered as representing the digit $2^0$, the row 20 as representing the digit $2^1$, the row 18 as representing the digit $2^2$, and so on. Therefore, the series of brushes positioned along the axis Y—Y will produce output voltages in any position corresponding to an ascending order of multi-digit binary numbers if the disc 10 rotates in a counterclockwise direction. At any instant, the binary number represented by the voltages across these brushes will correspond to the analog quantity represented by the angular position at that instant of the shaft coupled to the disc 10. It should be evident that the number of tracks on the disc 10 in FIGURES 1A and 2A is merely illustrative. More or less tracks can be used depending upon the number of digits required for the multi-digit binary number. The number of digits, of course, determines the digital resolution of the disc which, in turn, determines the accuracy of the system. As noted briefly above, for greater resolution, it may be desirable for the size of the disc to be increased accordingly, or for multiple inter-coupled discs to be used.

When a single row of brushes is utilized along the Y—Y axis in the manner suggested above, the system is susceptible to reading ambiguities as described previously. These ambiguities are not particularly serious in the least significant track 22, for example. However, if the brush associated with the track 12 of greatest digital significance should make a transition before or after the precise time when such a transition should be made, a substantial error would be produced. This follows, because the brush associated with the track 12 would then provide a reading for the greatest significant bit, which would, for example, be "0" instead of "1," or vice versa.

To eliminate the possibility of such reading ambiguities, the prior art assembly shown in FIGURE 1A uses a pair of brushes for each track of the conductive segments on the commutator disc, with the exception of the least significant track 22.

A single electric contact brush 26 is associated with the outer track 22, which is the track representing the least significant digit. However, in the prior art representation of FIGURE 1A, as in the assembly of the copending Retzinger application, a brush 28 and a brush 30 are positioned to engage the conductive and non-conductive segments of the track 20. Similarly, a pair of brushes 32 and 34 are positioned to engage the conductive and non-conductive segments in the track 18. Likewise, a pair of brushes 36 and 38, a pair of brushes 40 and 42, and a pair of brushes 44 and 46 are positioned to engage the conductive and non-conductive segments of the tracks 16, 14 and 12, respectively. Also, and as mentioned previously, a brush 47 is positioned adjacent the disc to engage the conductive track 13, and this latter brush is connected to ground. This provides a ground connection to all the conductive segments which are all connected to the conductive track 13, as mentioned above.

When the disc 10 of the prior art assembly of FIGURE 1A is in the "0" position, as illustrated, the aligned leading edges of a non-conductive segment in each of the tracks 12, 14, 16, 18, 20 and 22 extends along the axis Y—Y, as mentioned above. For this "0" position, the brush 26 is on the leading edge of a non-conductive segment of the track 22, and the lagging brushes 28, 32, 36, 40 and 44 are all engaging conductive segments in their associated tracks. For this position, the first group of lagging brushes 28, 32, 36, 40 and 44 are disposed on the trailing side of the Y—Y axis; and leading brushes 30, 34, 38, 42 and 46 of the second group are displaced on the leading side of the Y—Y axis. Each of the latter group of brushes is positioned to lead the brush 26 by an angular distance substantially equal to one-quarter of the length of the conductive or non-conductive segments in its corresponding track.

As the disc 10 in the prior art assembly of FIGURE 1A rotates in a counterclockwise direction, the conductive segments in each of its concentric tracks assume different relationships with the brushes for an ascending progression of binary numbers. The binary digit represented by the track 22 is read by the brush 26 since that is the only brush associated with that track. However, the digit represented by the track 20 is read by the selected one of the brushes 28 and 30. Similarly, the binary digit represented by the track 18 is read by the selected one of the brushes 32 and 34, and the digit represented by the track 16 is read by the selected one of the brushes 36 and 38. Likewise, the digits represented by each of the other tracks are sensed by the selected one of the pair of brushes associated with such other tracks.

To prevent reading ambiguities, the brush selected in each of the tracks 12, 14, 16, 18 and 20 must be within the confines of a conductive or non-conductive segment in its corresponding track at the time it is read, and not near a border line between a conductive and a non-conductive segment. The use of the dual brushes in each succeeding track in the prior art assembly of FIGURE 1A assures that a brush will not be passing the border between the segments in any track at the time when it is selected so that a reading is made. This assures that there will be no possibility of a brush reading "0" to indicate a non-conductive segment when it should be reading "1" to indicate a conductive segment, or vice versa.

The physical relationship between the various brushes in the prior art assembly of FIGURE 1A may be understood from a particular example, and by an examination of the developed view of FIGURE 1B. When, for example, the brush 26 of the track 22 engages a particular non-conductive segment in that track, the leading brush 30 in the track 20 has already become positioned in contacting relationship with a particular conductive or non-conductive segment in the latter track. The leading brush 30 continues to contact the particular segment in the track 20 as long as the brushes 26 engages the particular non-conductive segment in the track 22. (See for example the second position of the disc, represented by the primed brush numbers in FIGURE 1B) to assure a true indication from the track 20, the leading brush in that track is selected when the brush 26 engages a non-conductive segment in the track 22. This selection is proper because the leading brush is in positive engagement with the corresponding conductive or non-conductive segment in the track 20 during this time, whereas the lagging brush 28 associated with the track 20 is passing from one segment to another.

Conversely, when the brush 26 in the track 22 comes into engagement with a conductive segment of that track, it will be understood from the partial double primed brush representation in FIGURE 1B, that the lagging brush 28 in the track 20 is already contacting the particular conductive or non-conductive segment which is to be read for a true indication of the analog quantity at that instant. Moreover, the lagging brush 28 remains in that segment until after the brush 26 passes to the next non-conductive segment of the track 22. Therefore, in the prior art analog-to-digital converter of FIGURE 1A, the lagging brush 28 is selected for reading whenever the brush 26 engages a conductive portion of the track 22. This selection of the lagging brush 28 in the track 20 is proper at this time because the leading brush 30 in that track is passing from one segment to another when the brush 26 is passing through a conductive portion of the track 22.

Therefore, in the prior art assembly of FIGURE 1A each transition of the brush engagement in the least significant digit track 22 from a non-conductive to a conductive segment causes the lagging brush 28 of the track 20 of the next least significant digit to be selected. Alternately, the transition of the brush engagement in the least significant track 22 from a conductive to a non-conductive segment causes the leading brush 30 in the track 20 to be selected. As mentioned above, this controlled selection of the leading and lagging brushes in the track 20 occurs under the control of the brush engagement in the track 22 of the least significant bit, and the selection occurs after the selected brush in the track 20 is already in positive contact with its proper segment.

Similarly, an examination of FIGURE 1B will reveal that whenever the selected brush in each of the successive tracks of the prior art assembly of FIGURE 1A contacts a non-conductive segment in that track, the leading brush in the next succeeding track is already in positive contact with a corresponding conductive or non-conductive segment in the succeeding track and is selected. On the other hand, whenever the selected brush in any of the succeeding tracks comes into engagement with a conductive segment in that track, the lagging brush in the next succeeding track is selected because it is already in positive engagement with its proper segment in the succeeding track.

Therefore, in the prior art assembly of FIGURE 1A, the brushes in the succeeding tracks are selected so that readings will be made when the selected brush in each of the succeeding tracks is in full and positive contact with a conductive or non-conductive segment of that track.

As mentioned above in the prior art assembly of FIGURE 1A, whenever the selected brush in any track engages a conductive segment, the lagging brush in the next succeeding track is selected because it is already in positive engagement with its contacted segment in the succeeding track. Conversely, whenever the selected brush in any track engages a non-conductive segment, the leading brush in the next succeeding track is selected because it already is in full engagement with its contacted segment in the succeeding track. This, as noted previously, has sometimes created a problem in that under some circumstances a control effect or switching has been carried out upon the contacting of a brush with a non-conductive segment, and at other times upon the contacting of a brush with a conductive segment. This, as also noted, has required either two types of logical circuitry, or it has required the use of extraneous inverters.

In accordance with the concepts of the present invention, as illustrated in the first embodiment of the invention shown in FIGURE 2A, each of the lagging brushes is shifted by a full segment in its particular track. Thus, the brush 28 in FIGURE 1A is shifted to the position **28*a* in FIGURE 2A, the brush 32 in FIGURE 1A is shifted to the position 32*a* in FIGURE 2A, the brush 40 in FIGURE 1A is shifted to the position 36*a* in FIGURE 2A, the brush 40 in FIGURE 1A is shifted to the position 40*a* in FIGURE 2A, and the brush 44 in FIGURE 1A is shifted to the position 44*a*** in FIGURE 2A.

The situation with respect to the lagging brushes is now reversed. For if a leading brush represents binary 1 when it contacts a conductive segment on the information member and a binary 0 when it contacts a non-conductive segment, the corresponding lagging brush represents binary 0 when it contacts a conductive segment, and binary 1 when it contacts a non-conductive segment.

An examination of FIGURE 2B will reveal that the only difference between the brush-segment relationship in FIGURE 1B and the brush-segment relationship in FIGURE 2B, is that the lagging brushes in FIGURE 2B in each instance contact a conductive segment when they contacted a non-conductive segment in FIGURE 1A as the disc 10 rotates, and vice versa.

It will therefore be apparent that with the prior art arrangement illustrated in FIGURES 1A and 1B a control effect or switching is required when a leading brush reads a binary "1" on a conductive segment, and therefore must switch over to a lagging brush, and also when a lagging brush reads a binary "0" on a non-conductive segment, and therefore must switch over to a leading brush. However, in accordance with the present invention, as illustrated in FIGURES 2A and 2B, since the lagging brush has been moved one full segment and always reads false, it is now on a conductive segment when it reads binary "0" and must switch over to a leading brush. Therefore, switching is always initiated by a brush on a conductive segment.

Therefore, and as will be described in detail in conjunction with FIGURES 5 and 6, only one type of logic is required in the read-out networks used in conjunction with the analog-to-digital converters of the present invention, and high-pass logic gates can conveniently be used throughout.

Figure 3A:
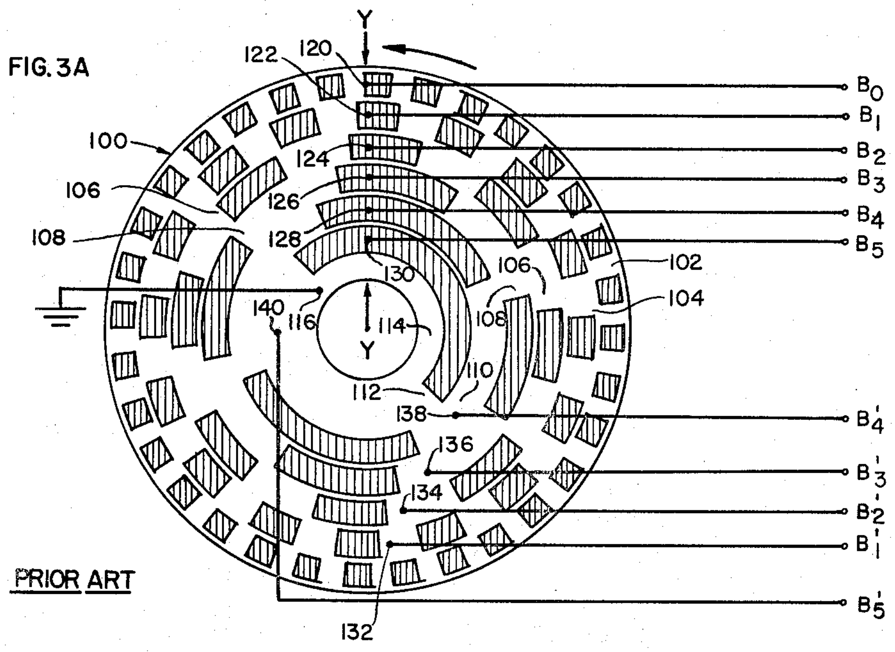
FIGURE 3A is a schematic representation of a dual brush digitizing disc assembly of the prior art and similar to the assembly described and claimed in the Miller patent in which the leading brushes are radially aligned and the conductive segments are skewed to obtain certain electrical and mechanical advantages.

The prior art analog-to-digital disc assembly of FIGURE 3A is similar, as mentioned above, to the converter assembly disclosed and claimed in the Miller patent, No. 2,873,441. In the prior art assembly of FIGURE 3A it will be noted that the conductive and non-conductive segments in the successive rows are skewed with respect to one another.

The assembly shown schematically in FIGURE 3A includes a disc 100 which may be similarly constructed to the disc 10 of FIGURES 1A and 2A, and which reads an ascending series of binary numbers when rotated in a counter-clockwise direction. The disc 100 includes an outer annular track 102 which represents the least significant digit, and it includes a plurality of successive tracks 104, 106, 108, 110 and 112 which represent digits of increasing significance.

Each of the annular tracks on the disc 100 of FIGURE 3A includes conductive and non-conductive segments. The nonconductive segments are shown by the shaded areas. All of the conductive segments are connected to one another and to an inner annular conductive track 114. A brush 116 connects the inner annular track 114, and all the conductive segments connected to it, to a point of reference potential such as ground.

As in the previous embodiments, and for a radix of 2, each of the conductive and non-conductive segments in any track are of equal length, and each track contains twice as many segments as a preceding track.

The prior art converter assembly of FIGURE 3A includes a set of leading brushes which are designated 120, 122, 124, 126, 128 and 130. These brushes, as illustrated, may be positioned in radial alignment. These brushes are positioned to engage the conductive and non-conductive segments in the annular tracks 102, 104, 106, 108, 110 and 112 respectively. The prior art converter assembly of FIGURE 3A also includes a group of lagging brushes 132, 134, 136, 138 and 140. These lagging brushes are disposed in the illustrated positions to engage the conductive and non-conductive segments in the annular tracks 102, 104, 106, 108, 110 and 112 respectively.

An examination of FIGURES 3A and 3B will reveal that the relationship between the leading and lagging brushes with the conductive and non-conductive segments in their associated annular tracks as the disc 100 rotates in a counterclockwise direction is the same as in the prior art assembly of FIGURE 1A. In the latter prior art assembly, the single brush 120 engages the segments in the least significant track 102 and the selection of the brushes 122 and 132 of the next track 104 is on the basis as to whether the brush 120 is in engagement with a conductive or a non-conductive segment. The selection of the brushes of the succeeding tracks is on the same basis.

Again it will be observed that in the prior art assembly of FIGURE 3A, and as shown in its developed state in FIGURE 3B, switching is required when a leading brush is on a conductive segment reading a binary "1" and must select a lagging brush, and also when a lagging brush is on a non-conductive segment reading a binary "0" and must select a leading brush. This arrangement also requires the use of high pass and low pass logic or inverters in the read out circuitry.

Figure 4A:
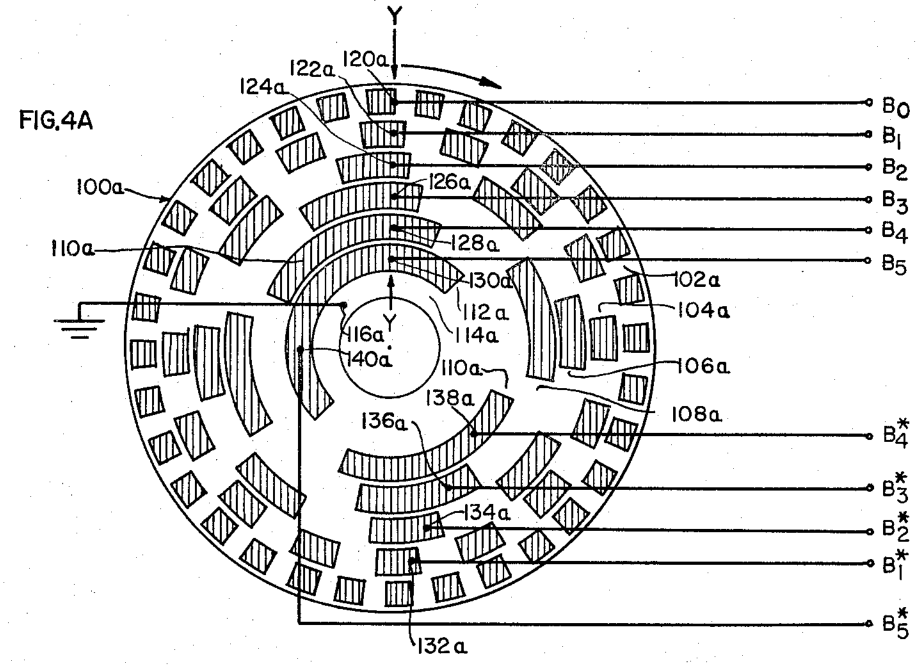
PRIOR ART FIG. 4A
FIGURE 4A is a schematic representation of the digitizing disc assembly of FIGURE 3A as modified in accordance with the invention by which a mirror image of the disc of FIGURE 3A with the same brush block shown in FIGURE 3A is provided so as to achieve the objectives of the present invention.

The digitizing disc 100*a* of FIGURE 4A is similar to the disc 100 of FIGURE 3A, with the exception that the conductive and non-conductive segments on the disc 100*a* are positioned on that disc in a mirror image pattern of the pattern by which the conductive and non-conductive segments are arranged on the disc 100. An examination of FIGURE 4A will not reveal that the lagging brushes of all the tracks now engage non-conductive segments for each angular position of the disc 100*a* in which the corresponding brushes in FIGURE 3A engaged conductive segments, and vice versa, and therefore the lagging brushes must all be read false.

For example, the discs 100 and 100*a* in FIGURES 3A and 4A are assumed to be in the same angular position. However, the brushes 132, 134, 136, 138 and 140 in FIGURE 3A engage conductive segments in their associated tracks 104, 106, 108, 110, 112 and 114; whereas the corresponding brushes 132*a*, 134*a*, 136*a*, 138*a* and 140*a* in FIGURE 4A each engages a non-conductive segment in their corresponding tracks 104*a*, 106*a*, 108*a*, 110*a*, 112*a* and 114*a*.

Figures 5, 6:
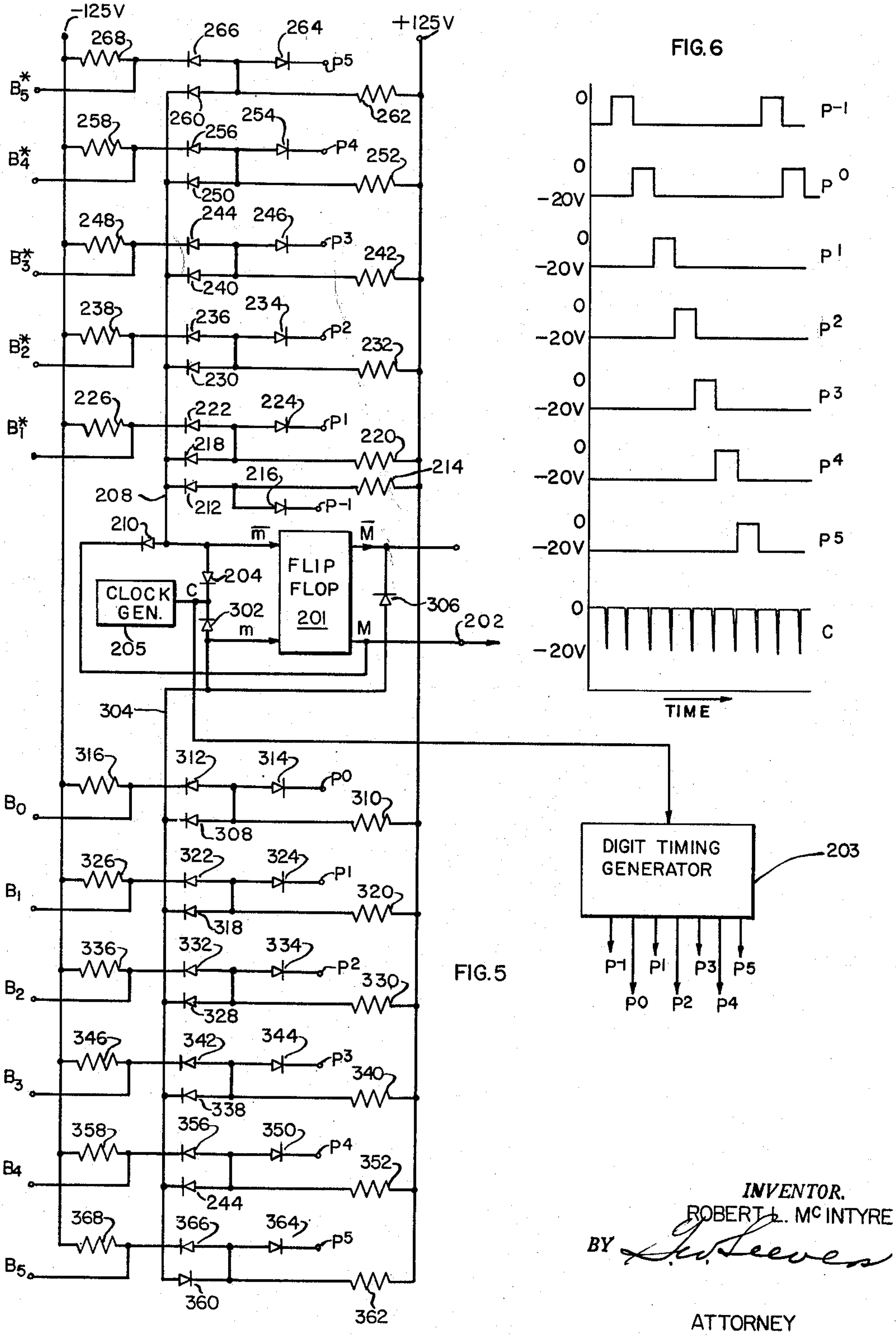
FIGURE 5 illustrates appropriate logical circuitry which may be electrically connected to the brushes of the discs of FIGURE 2A and 4A to provide a serial readout from the discs and in which but one type of logical gates is used.
FIGURE 6 is a series of curves useful in explaining the operation of the logical control circuitry of FIGURE 5.

However, it will be apparent from FIGURES 4A and 4B that the disc 100*a* normally reads an ascending series of binary numbers when rotated in a clockwise direction, because it is a mirror image of disc 100, but may be read in the opposite counterclockwise direction by making a simple change in the wiring to invert the logic of the circuitry illustrated in FIGURE 5 and read the radially aligned brushes 122*a*, 124*a*, 126*a*, 128*a* and 130*a* as false and read the other brushes 132*a*, 134*a*, 136*a*, and 138*a* and 140*a* as true.

In FIGURE 2A the brush 26 of the least significant track is shown as being connected to an output terminal $B_0$, and the leading brushes 30, 34, 38, 42 and 46, which also read true, are shown as being connected to respective output terminal $B_1$, $B_2$, $B_3$, $B_4$ and $B_5$. The lagging brushes 28*a*, 32*a*, 36*a*, 40*a* and 44*a*, which read false, are shown as being respectively connected to output terminals $B_1^*$, $B_2^*$, $B_3^*$, $B_4^*$, and $B_5^*$.

In FIGURE 4A the brush 120*a* with corresponding leading brushes 122*a*, 124*a*, 126*a*, 128*a* and 130*a* and lagging brushes 132*a*, 134*a*, 136*a*, 138*a* and 140*a* are respectively connected to similarly designated terminals. In FIGURE 1A, the lagging brushes 30, 34, 38, 42 and 44 are respectively connected to the output terminals $B_1'$, $B_2'$, $B_3'$, $B_4'$ and $B_5'$. In FIGURE 3A the corresponding lagging brushes 132, 134, 136, 138 and 140 are respectively connected to similarly designated terminals.

Appropriate high-pass logical circuitry for providing a serial read-out of the disc of FIGURES 2A and 4A is illustrated in FIGURE 5. The circuitry of FIGURE 5 is specifically intended to operate in conjunction with the discs of FIGURES 3A and 4A reading in the direction indicated. It will be evident as the description proceeds, that a simple change in the wiring and logic of FIGURE 5 will render it it suitable for operation in conjunction with the disc of FIGURES 2A and 4A to read an ascending series of binary numbers for reverse rotation of the disc.

The logical circuitry of FIGURE 5 includes a flip-flop 201. The lower output M of the flip-flop 201 is connected to an output terminal 202. The digit timing pulse $P^{-1}$ together with a series of digit timing pulses $P^0$, $P^1$, $P^2$, $P^3$, $P^4$ and $P^5$ may be derived from any suitable digit timing generator 203.

For each read-out operation the five output terminals $B_1$, $B_2$, $B_3$, $B_4$, $B_5$, or $B_1$*, $B_2$*, $B_3$*, $B_4$* and $B_5$*, as well as the output terminal $B_0$, are sampled in succession. The digit timing pulses referred to above are produced to achieve this sampling. These pulses may have the timing illustrated in FIGURE 6. It will be observed that they occur in timed coincidence with clock pulses C from a clock generator 205, and that each of the digit timing pulses rises to a 0 value from a −20 volt value during the interval of its occurrence. The clock pulses C, on the other hand are a series of sharp trigger pulses which extend negatively from 0 volts to −20 volts, as illustrated in FIGURE 6.

The digit timing pulse $P^{-1}$ occurs before each read-out operation, and is used to pre-set the flip-flop 201 to a false state, as will be explained. Then, the digit timing pulses occur in succession and at an interval timed by successive clock pulses, so that the output terminals may be selectively sampled.

The upper input terminal ($\overline{m}$) of the flip-flop 201 is connected to the anode of a diode 204, the cathode of which is connected to an appropriate source of the clock pulses. A lead 208 is connected to the anode of a diode 210, the cathode of that diode being connected to the lower output terminal (M) of the flip-flop 201. The lead 208 is also connected to the cathode of a diode 212, the anode of which is connected to a resistor 214 and to the anode of a diode 216. The resistor 214 has a resistance, for example, of 220 kilo-ohms, and that resistor is connected to the positive terminal of a direct voltage source having a value, for example, of 125 volts. The digit timing pulses $P^{-1}$ are introduced to the cathode of the diode 216.

The lead 208 is also connected to the cathode of a diode 218, the anode of which is connected to a resistor 220 and to the anode of a diode 222 and to the anode of a diode 224. The resistor 220 has a resistance of 180 kilo-ohms, and it is connected to the positive terminal of the 125 volt direct voltage source. The digit timing pulses $P^1$ are introduced to the cathode of the diode 224. A resistor 226 is connected to the cathode of the diode 222. The output terminal $B_1$* of the assembly of FIGURE 2A or 4A is also connected to the cathode of the diode 222. The resistor 226 has a resistance of 120 kilo-ohms, and it is connected to the negative terminal of the 125 volt direct voltage source.

The lead 208 is also connected to the cathode of a diode 230. The anode of the diode is connected to a resistor 232. The resistor 232 has a resistance of 180 kilo-ohms, and it is connected to the positive terminal of the 125 volt direct voltage source. The anode of the diode 230 is also connected to the anode of a diode 234 and to the anode of a diode 236. The digit timing pulses $P^2$ are introduced to the cathode of the diode 234. The output terminal $B_2$* of the assembly of FIGURE 2A or 4A is connected to the cathode of the diode 236, as is a resistor 238. The resistor 238 has a resistance of 120 kilo-ohms, and it is connected to the negative terminal of the 125 volt direct voltage source.

The lead 208 is connected to the cathode of a diode 240. The anode of that diode connects with a 180 kilo-ohm resistor 242, which in turns is connected to the positive terminal of the 125 volt direct voltage source. The resistor 242 is also connected to the anodes of a pair of diodes 244 and 246. The cathode of the diode 246 receives the digit timing pulses $P^3$. The output terminal $B_3$* of the assembly of FIGURE 2A or 4A is connected to the cathode of the diode 244. A 120 kilo-ohm resistor 248 is also connected to that cathode and to the negative terminal of the 125 volt direct voltage source.

The lead 208 is also connected to the cathode of a diode 250. The anode of the diode 250 is connected to a resistor 252, to the anode of a diode 254, and to the anode of a diode 256. The resistor 252 has a resistance of 180 kilo-ohms, and it is connected to the positive terminal of the 125 volt direct voltage source. The digit timing pulses $P^4$ are applied to the cathode of the diode 254. A 120 kilo-ohm resistor 258 is connected to the cathode of the diode 256 and to the negative terminal of the direct voltage source which has a value of 125 volts. The output terminal $B_4$* of FIGURE 2A or 4A is also connected to the cathode of the diode 256.

Finally the lead 208 is connected to the cathode of a diode 260, the anode of which is connected to a 180 kilo-ohm resistor 262. The resistor 262 is connected to the positive terminal of the 125 volt direct voltage source. The anode of the diode 260 is connected to the anode of a diode 264 and to the anode of a diode 266. The digit timing pulses $P^5$ are applied to the cathode of the diode 264. The output $B_5$* of FIGURE 2A or 4A is connected to the cathode of the diode 266. A 120-kilo-ohm resistor 268 is also connected to that cathode, and the resistor is also connected to the negative terminal of the 125 volt direct voltage source.

The lower input terminal ($m$) of the flip-flop 201 is connected to the anode of a diode 302, the cathode of which receives the clock pulses C. The anode of the diode 302 is connected to a lead 304. The lead 304 is connected to the anode of a diode 306, the cathode of which is connected back to the upper output terminal ($\overline{M}$) of the flip-flop 201.

The lead 304 is connected to the cathode of a diode 308. The anode of the diode 308 is connected to a resistor 310 which has a resistance of 180 kilo-ohms, and which is connected to the positive terminal of the 125 volt direct voltage source. The resistor is also connected to the anode of a diode 312 and to the anode of a diode 314. The cathode of the diode 314 receives the digit timing pulses $P^0$. The cathode of the diode 312, on the other hand, is connected to a 120-kilo-ohm resistor 316 and to the output terminal $B_0$ of FIGURE 2A or 4A. The resistor 316 is connected to the negative terminal of the 125 volt direct voltage source.

The lead 304 is also connected to the cathode of a diode 318. The anode of the diode 318 is connected to a resistor 320 which has a resistance of 180 kilo-ohms, and which is connected to the positive terminal of the 125 volt direct voltage source. The anode of the diode 318 is also connected to the anode of a diode 322 and to the anode of a diode 324. The digit timing pulses $P^1$ are intoduced to the cathode of the diode 324. A resistor 326 of 120 kilo-ohms is connected to the cathode of the diode 322 and to the negative terminal of the 125 volt direct voltage source. The output terminal $B_1$ of FIGURE 2A or 4A is also connected to the cathode of the diode 322.

The lead 304 is further connected to the cathode of a diode 328. The anode of this diode connects with a resistor 330 which has a resistance of 180 kilo-ohms. This resistor is connected to the positive terminal of the 125 volt direct voltage source. The anode of the diode 328 is also connected to anode of a diode 332 and to the anode of a diode 334. The digit timing pulses $P^2$ are applied to the cathode of the diode 334. A resistor 336 is connected to the cathode of the diode 332, and this resistor has a resistance of 120 kilo-ohms. The resistor 336 is connected to the negative terminal of the 125 volt direct voltage source. The output terminal $B_2$ of FIGURE 2A or 4A is also connected to the cathode of the diode 332.

The lead 304 is also connected to the cathode of a diode 338. The anode of the diode 338 is connected to a 180 kilo-ohm resistor 340 and to the anode of a diode 342 and to the anode of a diode 344. The resistor 340 is connected to the positive terminal of the 125 volt direct voltage source. A 120 kilo-ohm resistor 346 is connected to the cathode of the diode 342, as is the terminal $B_3$ of FIGURE 2A or 4A. The resistor 346 connects with the negative terminal of the 125 volt direct voltage source. The digit timing pulses $P^3$ are introduced to the cathode of a diode 344.

The digit timing pulses $P^4$ are supplied to the cathode of a diode 350, the anode of which is connected to a resistor 352 and to the anodes of a pair of diodes 354 and 356. The resistor 352 has a resistance of 180 kilo-ohms, and it is connected to the positive terminal of the 125 volt direct voltage source. The cathode of the diode 354 is connected to the common lead 304. The cathode of the diode 356, on the other hand, is connected to a resistor 358 which has a resistance of 120 kilo-ohms. The resistor 358 is connected to the negative terminal of the 125 volt direct voltage source. The output terminal $B_4$ of FIGURE 2A or 4A connects with the cathode of the diode 356.

The lead 304 is also connected to the cathode of a diode 360. The anode of the diode 360 is connected to a resistor 362. This resistor has a resistance of 180 kilo-ohms, and it is connected to the positive terminal of the 125 volt direct voltage source.

The digit timing pulses $P^5$ are introduced to the cathode of a diode 364. The anode of the diode 364 connects with the resistor 362 and with the anode of a diode 366. The cathode of the diode 366 is connected to a resistor 368 which has a resistance of 120 kilo-ohms. The resistor 368 is connected to the negative terminal of the 125 volt direct voltage source. The cathode of the diode 366 is connected to the output terminal $B_5$ of FIGURE 2A or 4A.

The logical circuitry of FIGURE 5 is so designed that the flip-flop 201 is triggered by the digit timing pulse $P^{-1}$ so as to be in the proper state of operation before the sequential read-out of information from the brushes in the successive rows is initiated. This timing pulse is introduced to the cathode of the diode 216 to control the potentials on the plates of the diodes 212 and 216 so that the potentials on the plates of these diodes rises to 0 volts during the $P^{-1}$ pulse. This potential also appears on the plate of the diode 204. Because of this, the first clock pulse introduced to the cathode of the diode 204 is able to produce a negative pulse on the upper input terminal ($\overline{m}$) of the flip-flop 201. This negative pulse causes the flip-flop 201 to be triggered to the proper state for reading the outer brush $B_0$ and also any one of the leading true brushes $B_1$, $B_2$, $B_3$, $B_4$, $B_5$. A relatively high voltage is thus produced at ($\overline{M}$) which appears on the cathode of the diode 306, and a relatively low voltage appears at (M) and on the output terminal 202, indicating a binary (0) for the pre-set condition.

Then, should the brush $B_0$ contact a conductive segment during $P^0$ time when the anodes of the diodes 312 and 314 are established at 0 volts, a potential of 0 volts will be produced on the plate of the diode 308. Since a relatively high potential is also produced on the cathode of the diode 306 as a result of the state of the flip-flop 201, a potential of 0 volts is introduced to the plate of the diode 302. Upon the introduction of the next negative clock pulse to the cathode of the diode 302, a negative signal is produced on the plate of the diode to trigger the flip-flop 201 to the opposite state where ($\overline{M}$) is low and (M) is high indicating a binary (1) at the output terminal 202. This also causes the control effect or switching action, since the flip-flop 201 is now in the opposite state for reading any one of the false lagging brushes $B_1$*, $B_2$*, $B_3$*, $B_4$* and $B_5$*.

If the brush associated with the $B_1$* contact now engages a conductive segment in its track at $P^1$ time, a potential of 0 volts is produced on the plate of the diode 218 and is introduced to the plate of the diode 204. This causes a triggering signal to be produced on the plate of the diode 204 upon the introduction of the next clock signal to the cathode of the diode. This signal triggers the flip-flop 201 switching it to the proper state to represent a binary (0) with ($\overline{M}$) high and (M) low, and also read the next leading true brush. However, if the brush connected to the $B_1$* terminal engages a non-conductive segment in its track at $P^1$ time, a negative potential is produced on the plate of the diode 224. This negative potential prevents a triggering signal from being introduce to the ($\overline{m}$) input terminal of the flip-flop. Because of this, the flip-flop remains in its opposite state with the output at ($\overline{M}$) low and the output at (M) high to provide an indication of binary (1) at the output terminal 202, and also maintains the proper condition for reading the next lagging false brush.

If, on the other hand, the brush $B_0$ in the least significant track of the assembly of FIGURE 4A engages a non-conductive segment at $P^0$ time, a negative voltage is produced on the cathode of the diode 312 because of the flow of current through a circuit including the +125 volt terminal, the resistance 310, the diode 312 and the resistance 316. This negative voltage prevents the potential on the plate of the diode 302 from rising from a negative potential to a potential of 0 volts. Because of this, a negative triggering signal cannot be produced on the plate of the diode 302 upon the introduction of a negative clock signal to the cathode of the diode. This causes the flip-flop 201 to remain in the same state so that a relatively low voltage appears at the output terminal 202 for a representation of a binary (0) at $P^0$ time. Since the voltage at ($\overline{M}$) is high, the true logic circuitry is still in condition to read any one of the leading true brushes, when the next digit timing pulse is applied to select a brush in the next track.

It will be observed that the triggering of the flip-flop 201 is controlled during the digit times of $P^2$, $P^3$, $P^4$ and $P^5$ in a manner similar to that described above. In each instance, the flip-flop 201 is triggered to provide an output indication of the binary number equivalent to the analog quantity represented by the positioning of the disc relative to the brushes. Moreover, the state of operation of the flip-flop 201 at each digit time controls the selection of a brush from the pair of brushes in the next track in the following digit time in accordance with the basic rule of selection to preclude ambiguous reading, i.e. read a binary (0), select the next leading brush; read a binary (1), select the next lagging brush.

The digit timing pulses $P^{-1}$ through $P^5$, inclusive, may be made repetitive, so that successive serial read-outs are obtained on a cyclic basis to indicate the instantaneous angular position of the disc. It will be noted that if the least significant digit is read first, it is possible to read the disc at relatively high speeds, for it is not necessary for complete read-out to be effectuated between the movement from one segment to another in the least significant track. That is, the read-out of the more significant tracks may be carried out even though one or more segments in the least significant track have passed the reading brush in that track.

The invention provides, therefore, a new and improved converter disc assembly and associated read-out logical circuitry. The converter disc assembly of the present invention is so constructed that dual brushes are used in each track, except the track of least significance. Moreover, the dual brushes in the succeeding tracks are so arranged that one of the brushes represents a binary (1) when it engages a conductive segment and it represents a binary (0) when it engages a non-conductive segment, whereas the other brush of the pair represents a binary (0) when it engages a conductive segment and it represents a binary (1) when it engages a non-conductive segment.

The improved construction of the disc and brush combination permits, in the manner described above, simplifications to be obtained in the logical control circuitry associated with the disc. It is clear that all switching effects exerted on the flip-flop 201 are positively controlled by the engagement of a selected brush in a particular pair with a conductive segment in its associated track; and this obtains when the flip-flop is triggered to represent a transition from binary 0 to binary 1, and when it is triggered to represent a transition from binary 1 to binary 0. Therefore, it is possible to use only high-pass logical gates in the control circuitry of FIGURE 5. This obviates the disadvantages discussed above which arise when it is necessary to use both high-pass and low-pass logic gates in the control circuitry, or use an inverter circuit with the lagging brushes.

I claim:

1. An analog-to-digital converter comprising a coded information member having a plurality of rows with alternate first and second segments in each row and each successive row representing a more significant digit signal generating means coupled to said coded information member and adapted to provide first and second signals respectively representing a one digit and a second digit, and at least one readout element positioned to read said segments in the least significant digit row, and a pair of spaced read-out elements positioned to read said segments in each of the other rows, one read-out element of each of said pairs being positioned to read said one digit when adjacent one of said first segments and read said second digit when adjacent one of said second segments, and the other read-out element of each of said pairs being positioned to read said second digit when adjacent one of said first segments and read said one digit when adjacent one of said second segments.

2. An analog-to-digital converter, including: an information member having a plurality of first and second portions arranged in rows, the first and second portions in each row being alternately arranged relative to one another and the first and second portions in each row having lengths proportionately related to the length of the first and second portions in adjacent rows, a plurality of pairs of receiving means respectively disposed in coupled relationship to the first and second portions in the different rows to produce signals in accordance with the disposition of the individual receiving means of each pair relative to the associated first and second portions, a bi-stable member having first and second states of operation, a first plurality of electrical networks coupled to the bi-stable member and to the receiving means for rendering a first one of the receiving means in each of the plurality of pairs sequentially active and for establishing the bi-stable means in one of its two states of operation upon a disposition of the activated ones of the receiving means in coupled relationship to the first portions of the corresponding rows, and a second plurality of electrical networks coupled to the bi-stable member and to the receiving means for rendering the other of the receiving means in each of the plurality of pairs sequentially active and for establishing the bi-stable member in the other of its two states of operation upon a disposition of the other activated ones of the receiving means in coupled relationship to the first portions of the corresponding rows.

3. An analog-to-digital converter, including: an information member having a plurality of conductive and non-conductive portions arranged in rows, the conductive and non-conductive portions in each row being alternately arranged relative to one another, and each successive row having a progressively decreasing number of alternately conductive and non-conductive portions, and the conductive and non-conductive portions in each successive row having lengths proortionately related to the lengths of the conductive and non-conductive portions in adjacent rows, a plurality of pairs of contact means respectively associated with the conductive and non-conductive portions in the different rows to produce signals in accordance with the disposition of the individual contact means of each pair relative to the associated conductive and non-conductive portions, a bi-stable member having first and second states of operation, a first plurality of electrical networks coupled to the bi-stable member and to certain ones of the different contact means for rendering a first of the contact means in each of the plurality of pairs sequentially active and for establishing the bi-stable member in one of its two states of operation upon an engagement of the activated ones of the contact means with the conductive portions of the corresponding rows, and a second plurality of electric networks coupled to the bi-stable member and to other ones of the different contact means for rendering the other of the contact means in each of the plurality of pairs sequentially active and for establishing the bi-stable member in the other of its two states of operation upon an engagement of the activated ones of the contact means with the conductive portions of the corresponding rows.

4. An analog-to-digital converter, including: an information member having a plurality of conductive and non-conductive portions arranged in rows, the conductive and non-conductive portions of each row being disposed in alternate relationship and being of similar length relative to one another and substantially twice as long as the conductive and non-conductive portions in the preceding row, a plurality of paired contact means, each pair of contact means being disposed in contiguous relationship to the conductive and non-conductive portions in a different row, the individual contact means in each pair being displaced from each other by a particular distance dependent upon the length of the contiguous conductive and non-conductive portions, a bi-stable member having first and second states of operation, a first plurality of electrical networks coupled to the bi-stable member and to certain ones of the different contact means for rendering a first of the contact means in each of the plurality of pairs sequentially active and for establishing the bi-stable member in one of its two states of operation upon an engagement of the activated ones of the contact means with the conductive portions of the corresponding rows, and a second plurality of electrical networks coupled to the bi-stable member and to other ones of the different contact means for rendering the other of the contact means in each of the plurality of pairs sequentially active and for establishing the bi-stable member in the other of its two states of operation upon an engagement of the activated ones of the contact means with the conductive portions of the corresponding rows.

5. An analog-to-digital converter assembly including: a supporting medium having a plurality of electrically conductive elements and interposed non-conductive elements thereon arranged in tracks of different digital significance including a track of least digital significance and a plurality of tracks of progressively increasing binary digital significance, signal generating means coupled to said supporting medium and adapted to supply signals respectively representing a first binary indication and a second binary indication, means including a plurality of first brush members each positioned adjacent a different one of the tracks in said plurality to individually provide a first binary indication upon an engagement of one of said first brush members with a conductive element and a second binary indication upon an engagement of said one of said first brush members with a non-conductive element, and means including a plurality of second brush members each positioned adjacent a different one of said tracks in said plurality therein to individually provide a first binary indication upon an engagement of one of said second brush members with a non-conductive element and a second binary indication upon an engagement of said one of said second brush members with a conductive element.

6. An analog-to-digital converter assembly including a supporting medium having a plurality of electrically conductive elements and interposed non-conductive elements thereon arranged in tracks of different digital significance including a track of least digital significance and a plurality of tracks of progressively increasing binary digital significance, signal generating means connected to said supporting medium and adapted to supply signals respectively representing a first binary indication and a second binary indication, and means including a plurality of leading brush members each positioned adjacent a different one of the tracks in said plurality to individually provide a first binary indication upon an engagement of one of said leading brush members with a conductive element and a second binary indication upon an engagement of said one of said leading brush members with a non-conductive element, and means including a plurality of lagging brush members each positioned adjacent a different one of said tracks in said plurality therein to individually provide a first binary indication upon an engagement of one of said lagging brush members with a non-conductive element and a second binary indication upon a engagement of said one of said lagging brush members with a conductive element.

7. An analog-to-digital converter, including, a supporting disc having a plurality of first segments and interposed second segments arranged in concentric annular tracks of different digital significance including a track of least digital significance and a plurality of tracks of progressively increased digital significance, means including a receiving member positioned in coupled relationship to said track of least digital significance adapted to read said first and second segments in said least significant track, a first plurality of receiving members each positioned in coupled relationship to a different one of said tracks in the plurality to read the first and second segments in the coupled track for a first indication upon the reading of a first segment in the coupled track and for a second indication upon the reading of a second segment in the coupled track, and means including a second plurality of receiving members each positioned in coupled relationship to a different one of the tracks in the plurality to read successively the first and second segments in the coupled track for the second indication upon the reading of a first segment in the coupled track and for a first indication upon the reading of a second segment in the coupled track, and means including electrical circuitry responsive to signals produced by the receiving members in the first and second pluralities to select a receiving member from the first plurality upon the reading of a conductive segment by the receiving member of immediately less digital significance from the second plurality and to select a receiving member from the second plurality upon the reading of a conductive segment by the receiving member of immediately less digital significance from the first plurality.

8. The combination defined in claim 7 in which the first segments and the second segments in each of the annular tracks have equal angular lengths, and in which the number of segments in any one of the tracks is geometrically related to the number of segments in the adjacent tracks.

9. The combination defined in claim 7 in which the least significant annular track is positioned adjacent the rim of the disc, and in which the number of segments in any particular one of the annular tracks is double the number in the adjacent track disposed radially inwardly from the particular track and which includes means coupled to the first segments in the different tracks in the plurality for establishing the first segments at a reference potential.

10. An analog-to-digital converter, including a first plurality of control elements arranged in groups of different digital significance, a second plurality of control elements also arranged in said groups of different digital significance, said groups including a group of least digital significance and a plurality of groups of progressively increasing digital significance, a first plurality of members each positioned in coupled relationship with the control elements in the first and second pluralities in a different one of the groups in the plurality, a second plurality of members each positioned in coupled relationship to the control elements of the first and second pluralities in a different one of the groups in the plurality, first control circuitry coupled to the members of the first plurality to provide a first digital indication upon the disposition of selected ones of the members in the first plurality in coupled relationship to the control elements of the first plurality and to provide a second digital indication upon the disposition of selected ones of the members in the first plurality in coupled relationship to the control elements of the second plurality, and to obtain a selection of the member in the second plurality and representing the next digit of increased significance and to obtain such selection upon the production of the first digital indication, and second control circuitry coupled to the members of the second plurality to provide said first digital indication upon the disposition of selected one of the members in the first plurality in coupled relationship to the control elements of the second plurality and to provide said second digital indication upon the disposition of selected ones of the members in the second plurality in coupled relationship to the control elements of the first plurality and to obtain a selection of the members in the first plurality and representing the next digit of increased significance and to obtain such selection upon the production of the second digital indication.

11. An analog-to-digital converter, including: an information member having a plurality of conductive and non-conductive segments disposed in tracks in an alternate configuration, a plurality of brushes each disposed in coupled relationship to the conductive segments in a particular track and being disposed in paired relationship relative to the different tracks in the plurality, first brushes in the different pairs forming a first group and second brushes in the different pairs forming a second group, means including first electrical circuitry coupled to the brushes in the plurality for selecting one of the brushes in each pair and in a particular one of the first and second groups upon the disposition of the selected brush in the preceding pair and in the other one of the first and second groups in coupled relationship to a conductive segment in the coupled track, and means including second electrical circuitry coupled to the first electrical circuitry for producing a first output signal upon the disposition of the selected brush in each pair and in the first group in coupled relationship to a conductive segment and upon the disposition of the selected brush in each pair and in the second group in coupled relationship to a non-conductive segment and for producing a second output signal upon the disposition of the selected brush in each pair and in the first group in coupled relationship to a non-conductive segment and upon the disposition of the selected brush in each pair and in the second group in coupled relationship to a conductive segment.

12. An analog-to-digital converter comprising a coded member having a plurality of rows with alternate conductive and non-conductive segments in each row and each successive row representing a more significant digit, at least one read-out element positioned to read said segments in the least significant digit row, a pair of spaced read-out elements positioned to read said segments in each of the other rows, said read-out elements in each pair being spaced from each other and positioned relative to said segments at one particular position in a manner such that one read-out element of each pair is approximately three quarters of a segment from the leading edge in a non-conductive segment when the other read-out element of each pair is approximately one quarter of a segment from the leading edge in a non-conductive segment and the read-out element in the least significant row is on the leading edge of a non-conductive segment and means coupled to said coded member adapted to supply signals for provision to said conductive segments whereby said read-out elements can distinguish conductive segments from non-conductive segments.

13. An analog-to-digital converter comprising a coded member having a plurality of rows with alternate first and second segments in each row and each successive row representing a more significant digit, at least one read-out element positioned to read said segments in the least significant digit row, a pair of spaced read-out elements positioned to read said segments in each of the other rows, said read-out elements in each pair being spaced from each other and positioned relative to said segments at one particular position in a manner such that one read-out element of each pair is approximately three quarters of a segment from the leading edge in one of said second segments when the other read-out element of each pair is approximately one quarter of a segment from the leading edge in one of said second segments and the read-out element in the least significant row is on the leading edge of one of said second segments and means coupled to said coded member and adapted to generate electrical signals to enable said read-out elements to distinguish as between said first and second segments.

References Cited in the file of this patent

UNITED STATES PATENTS

| | | |
|---|---|---|
| 2,750,584 | Goldfischer | June 12, 1956 |
| 2,852,764 | Frothingham | Sept. 16, 1958 |
| 2,866,184 | Gray | Dec. 23, 1958 |
| 2,873,441 | Miller | Feb. 10, 1959 |
| 2,958,860 | Petherick | Nov. 1, 1960 |
| 2,977,582 | Wolman | Mar. 28, 1961 |
| 3,056,956 | Retzinger | Oct. 2, 1962 |

OTHER REFERENCES

"Electronic Equipment," August 1955, pp. 12 and 13.